No. 753,822. Patented March 1, 1904.

UNITED STATES PATENT OFFICE.

EDWARD C. BROADWELL, OF CHICAGO, ILLINOIS, ASSIGNOR, BY DIRECT AND MESNE ASSIGNMENTS, TO JOHN A. LYONS, OF CHICAGO, ILLINOIS, AND SARAH A. STARRING, OF SPRINGFIELD, OHIO.

METHOD OF EXTRACTING GOLD FROM REBELLIOUS ORES.

SPECIFICATION forming part of Letters Patent No. 753,822, dated March 1, 1904.

Application filed March 7, 1902. Serial No. 97,189. (No specimens.)

*To all whom it may concern:*

Be it known that I, EDWARD C. BROADWELL, a citizen of the United States, and a resident of Chicago, in the county of Cook and State of Illinois, have invented a new and useful Method of Extracting Gold from Rebellious Ores; and I do hereby declare that the following is a full, clear, and exact specification thereof.

This invention relates to methods of extracting gold from rebellious ores, and more particularly for extracting gold from rebellious ores containing lime, soft ferric oxid, arsenic, antimony, &c., without previous roasting. Heretofore selenic, iodic, arsenic, and antimonic acids were the only single acids known to dissolve gold, none of which acids have any practical utility, owing to their slowness of action and cost. I have discovered that pure hypochlorous acid containing no chlorin gas has this property and will also dissolve platinum.

I am aware that hypochlorite of lime has been utilized to obtain the chlorin gas used in previous leaching processes, also that it has been used in conjunction with a mineral acid to form a solution for dissolving gold; but even in this case little if any hypochlorous acid is found in the solution, since as soon as it could be formed it reacts with the hydrochloric acid necessarily present in all cases mentioned of its (bleach-lime) previous use to give a result of chlorin gas dissolved in the water present.

My method has for its purpose the extraction of gold from rebellious ores containing lime, soft ferric oxid, arsenic, antimony, &c., without previous roasting, a result not capable of accomplishment by either the chlorination or cyanid methods.

In carrying out my invention instead of using a mineral acid with an alkaline or alkaline-earth hypochlorite I use with an alkaline or alkaline-earth hypochlorite a suitable oxy-salt of such heavy metals as can be precipitated by hydrogen sulfid from their acid solutions, such as copper sulfate. This reacts with the hypochlorite, producing cupric hypochlorite, which latter answers to all intents and purposes as would true pure hypochlorous acid—that is to say, no chlorin is eliminated. Theoretically part of the cupric hypochlorite is dissociated, because the hypochlorous acid is so feeble an acid and the cupric hydrate so moderately strong a base. This cupric hydrate is of course not precipitated as such, nor does it in all probability really exist as such in the solution in any other sense than as a tendency to form. It suffices that I find the cupric hypochlorite, as well as all other soluble hypochlorites of all heavy metals which can be precipitated by hydrogen sulfid from their acid solutions, to act for the purpose of gold solution and silver chloridization the same as would true hypochlorous acid. In the event of much silver being present the solution is made slightly alkaline with ammonia or alkaline ammonia salts.

My motive in using cupric hypochlorite is to take advantage of the many functions the copper can perform. Among these are its ability to coat the particles of iron pyrites and other sulfids with a covering of metallic copper or in some instances copper sulfid, thus preventing a waste of the hypochlorous-acid equivalent present, which is needed to react with the gold, silver, and platinum. It also has a tendency to combine with the arsenic and antimony when they are present as oxids, giving an arseniate and antimoniate of copper less susceptible to oxidation at the expense of the hypochlorous acid should these be in the gangue. The deleterious effects of these metals, which are the drawback of any of the old leaching methods, are thus avoided. The accidental presence of chlorin, bromin, or iodin does not assist or interfere with the operation of my process.

I do not limit myself to the treatment of raw ores, as it is evident that in some cases an ore would preferably have to be roasted, especially where the gold was either incased in the pyrites or other mineral in so minute a condition that even the pulverization of the ore did not expose it to chemical action or where it may have been in chemical combination with, say, a sulfid or tellurid, the former case being a mooted question among chemists.

I claim as my invention—

1. The method of extracting gold or platinum from rebellious ores, comprising first pulverizing the ore, next mixing the same with an alkaline or alkaline-earth hypochlorite solution to which proper molecular quantities of the oxysalt of a heavy metal which can be precipitated by hydrogen sulfid from its acid solutions has been added.

2. The method of extracting gold from rebellious ores comprising first pulverizing the ore, next mixing the same with an alkaline or alkaline-earth hypochlorite solution and adding to the mixture a salt of a heavy metal having an acid nature, precipitatable by hydrogen sulfid from its acid solution and capable of acting with the alkaline hypochlorite to give the hypochlorite of said heavy metal.

3. A method of extracting gold from rebellious ores comprising first pulverizing the same, then mixing the same with an alkaline or alkaline-earth hypochlorite solution and adding to the mixture copper-sulfate solution.

In testimony whereof I have hereunto subscribed my name to this specification in the presence of two subscribing witnesses.

EDWARD C. BROADWELL.

In presence of—
A. C. ODELL,
CHARLES W. HILLS.